United States Patent [19]
Fogarty

[11] Patent Number: 6,015,227
[45] Date of Patent: Jan. 18, 2000

[54] THERMOPLASTIC FOAM EXTRUSION SCREW WITH CIRCULATION CHANNELS

[76] Inventor: James Fogarty, 4970 Alfresco St., Boca Raton, Fla. 33428

[21] Appl. No.: 09/085,316

[22] Filed: May 26, 1998

[51] Int. Cl.[7] .................................................. B29B 7/42
[52] U.S. Cl. ............................................... 366/81; 366/90
[58] Field of Search .......................... 366/79, 81, 88–90, 366/318, 319, 324; 425/204, 208, 209; 198/661, 670, 676

[56] References Cited

U.S. PATENT DOCUMENTS

| | | | |
|---|---|---|---|
| 1,428,602 | 9/1922 | Malekow | 366/324 |
| 1,468,581 | 9/1923 | Steenberg | 366/324 |
| 2,474,730 | 6/1949 | Espinasse et al. | 366/324 |
| 3,253,892 | 5/1966 | Brignac et al. | |
| 4,363,264 | 12/1982 | Lang et al. | 366/87 |
| 5,044,759 | 9/1991 | Gagliani | 366/88 |
| 5,476,550 | 12/1995 | Walker | 198/676 |

FOREIGN PATENT DOCUMENTS

| | | | |
|---|---|---|---|
| 341360 | 6/1936 | Italy | 366/324 |

*Primary Examiner*—Charles E. Cooley
*Attorney, Agent, or Firm*—Malloy & Malloy, P.A.

[57] ABSTRACT

A foam extrusion assembly having a melt region wherein a plurality of material pellets are melted and mixed by a mixing assembly with a blowing agent introduced via an agent addition assembly. The foam extrusion assembly further includes a heat extraction region structured to extract excess heat from the mixture of melted material pellets and blowing agent such that the mixture achieves an extrudable temperature. The heat extraction region includes an elongate barrel having at least one inlet and at least one outlet, the inlet being structured to receive the extrusion mixture therethrough for passage into the barrel wherein a heat extraction structure cooperatively disposed with the barrel draws heat therefrom. An extrusion screw is disposed in the barrel and includes at least one screw flight structured to rotate within the barrel and urge the extrusion mixture towards the outlet of the barrel where a die is disposed in order to form the finished product. Moreover, the screw flight includes at least one circulation channel defined therein and structured to receive quantities of the extrusion mixture therethrough upon rotation of the extrusion screw, thereby circulating the extrusion mixture towards the barrel for more effective and uniform cooling of the extrusion mixture to an extrudable temperature prior to passage through the die.

15 Claims, 2 Drawing Sheets

THERMOPLASTIC FOAM EXTRUSION SCREW WITH CIRCULATION CHANNELS

BACKGROUND OF THE INVENTION

1. Field of the Invention

The present invention relates to a thermoplastic extrusion assembly which provides a substantially homogeneous product, preferably a foam thermoplastic product, and which produces said product at a desired extrusion temperature and at an increased throughput rate over what is normally available, without requiring that a complex, costly and/or oversized extrusion assembly be implemented and further, without requiring substantial modification to existing manufacturing devices and procedures.

2. Description of the Related Art

The field of art associated with thermoplastic extrusion, and foam thermoplastic extrusion in particular, is quite specialized, and indeed, is quite different from that typically associated with metal, rubber, or non-foamed plastic extrusion. Specifically, foam extrusion generally requires an initial step of melting pellets, usually made of a thermoplastic material, and a subsequent step of mixing the melted thermoplastics with a foaming agent, such as a fluorocarbon (whether CFC, HCFC and/or HFC) or hydrocarbons (such as propane, butane, pentane, etc.), and possibly other agents such as nucleating agents, fire retardants and/or coloring agents, in an isolated extrusion environment. Moreover, the most effective foam extrusion techniques completely contain the extrusion material during the melting and mixing stages, maintaining the material in a non-foamed, viscous form until passed through an extrusion die and exposed to external forces. Indeed, it is when the extruded material exits the die of the foam extrusion assembly that it will foam (i.e. inflate and stiffen) into its ultimately usable form, such as films, planks, and large sheets from which meat trays, egg containers, small containers for butter and jelly, and the like, are formed. Accordingly, precision is imperative in order to ensure that an effective and complete mixing of the ingredients is achieved, thereby providing for a properly configured and homogeneous product, and further, to ensure that the entire extrusion system is well contained until the material passes through the die, thereby avoiding premature foaming of the extrusion material.

Of course, in addition to the above concerns associated with the formation of a foam product is the need to maintain the extrusion mixture at a rather precise extrusion temperature, corresponding the polymer or substance being used as the basis for the extrusion mixture, so as to achieve a proper viscosity of the extrusion mixture and permit proper forming of the extrusion mixture through a die, such as a profile die, tube die, sheet die, annular die, flat die or several other common types of dies. The rather precise extrusion temperature at which a desired range of viscosity is achieved is unfortunately, less than the initial "melt temperature", i.e. temperatures at which the pellets of thermoplastic extrusion material are melted, but cannot be too much less than that initial "melt temperature" for reasons about to be explained. As such, a substantial balance must be maintained. For example, if the melted extrusion mixture is permitted to cool too much, it will become too viscous and will fail to achieve the desired product density, becoming unusable, as in general, it will not move effectively through the extrusion assembly, let alone, out through the die. Conversely, if the temperature of the melted extrusion material is too high, its viscosity decreases significantly and the material is not dimensionally stable or shapeable as it flows through and importantly, from the die.

As can be appreciated, any one of the previously mentioned factors can have a significant effect on the productivity rate associated with the various phases of thermoplastic foam extrusion. Accordingly, typical thermoplastic foam extrusion processes are often designed to maximize the regulation and control over each factor. For example, a typical foam extrusion process is broken down into two separate phases, and indeed, often requires two separate extrusion devices linked with one another. The first phase of the procedure typically involves the effective melting of extrusion material pellets, such as a thermoplastic material particularly suited for the foam desired, and the subsequent mixing of those material pellets with the foaming agent and other various agents, as needed. Usually, this first phase of the procedure is performed within a very large and elongated mechanical extrusion device wherein a thermoplastic extrusion screw, and more specifically a melt screw, urges the material pellets through an elongate barrel causing the generation of frictional heat, and also from which melting heat is being applied. Indeed, the surface of the thermoplastic extrusion screw is rather slippery by design (i.e. often chrome plated and polished) and the material moves through the barrel as a result of a frictional engagement or shear when the extrusion material frictionally contacts the barrel surface. Moreover, it is the shear effect combined with the heated barrel which provides for effective melting of the extrusion material.

In addition to ensuring that proper homogeneous mixing is achieved, the first phase is also limited by the need to establish and maintain an isolated system. In particular, the isolated system prevents premature foaming of the thermoplastic material, and ensures that sufficient heating energy is being applied in order to effectively melt the material and permit complete mixing thereof. Many advances have been achieved in the industry so as to maximize the flow-through rates attainable by or within this first phase of the thermoplastic extrusion process. Unfortunately, however, actual output of the extruded product is still limited to levels well below those achievable in this initial phase as a result of the requirements and limitations of the second phase of the foam thermoplastic extrusion process.

In particular, unlike conventional thermoplastic extrusion which primarily requires a homogeneous mix, foam extrusion also includes a second phase which requires the evenly distributed and uniform cooling of substantially all of the melted and mixed extrusion material to a point where it is at a necessary extrusion temperature and consistency throughout. Usually, this second phase of the procedure is also performed within a very large and elongated mechanical extrusion device wherein a central thermoplastic extrusion screw, such as a foam cooling screw with a helix or paddle type configuration, urges the melted extrusion material through an elongated barrel to effect a cooling of the material. Given the need for a rather precise temperature, however, significant limitations relating to the turn rate of the central cooling screw and to the heat extraction rate achieved apply to this second phase of the process. Specifically, the turn rate of the central or cooling screw is limited because of the need to minimize the heat which results from shearing of the extrusion material with the wall surface of the barrel and internally by the material itself. As such, an increased flow-through rate of high quality cannot be achieved merely by speeding up the rotation of the screw. Furthermore, one cannot indefinitely merely counter the excess shear heat that is generated by providing for faster cooling merely by decreasing the temperature of the barrel, because if the mixture cools too much, an optimal viscous flow of the extrusion mixture is not maintained and productive passage through the die is dramatically impeded. Also, merely increasing the size of the extrusion barrel in the cooling phase is not an effective solution as such an assembly would become excessively large, cumbersome and financially impractical due to using such a large scale factor. Large scale cooling stage processes also involve potentially undesirable operation cost implications due to the typically longer product change-over time factor and the related materials costs of such large machines. Moreover, if one merely increases the size of the extrusion barrel in the cooling phase and the passage through the die is made long enough so as to allow temperature tempering of the extrusion mixture, the resistance to flow generated by such passage would detrimentally promote heat generation in the extrusion mixture within the barrel. Further, this restricted long passage would negate the normal tendency of the thermoplastic extrusion mixture to swell after passage from the die is retarded.

Accordingly, it is seen that one must balance the needs of a productive flow through rate with the requirements of practicality and an effective and evenly distributed cooling.

Many in the industry have nevertheless failed to recognize the above-described limitations. For example, some in the industry have sought to increase the productivity of the second or cooling phase of the extrusion process by increasing the amount of heat which is extracted at the extrusion barrel's surface. Unfortunately, these procedures have proven ineffective because when an amount of heat is extracted so as to effectively cool substantially all of the extrusion material throughout, the perimeter layers of the extrusion material, which are in more direct contact with the barrel surface, cool excessively and no longer provide a satisfactory extrudate. Thus, a primary difficulty associated with this cooling phase is the fact that the quantities of the extrusion mixture which are closest to the shaft of the central screw do not get effectively cooled, as a majority of the heat that is extracted comes first from the extruded material located about the perimeter area within the barrel of the second mechanical extrusion device. For example, as heat is extracted, the perimeter quantities of the extrusion material continue to get cooler and cooler while the interior quantities gradually cool to the desired, rather precise extrusion temperature. This yields extrusion material which is not of uniform consistency for proper extrusion. Indeed, in this second phase, as well as in the first phase, it is also noted that complete homogenization of the extrusion mixture is sometimes lacking, and as a result the finished product can be of diminished quality.

Accordingly, it is seen that the overall productivity of the present industry is still limited by the cooling phase of the extrusion process. To date, the only effective means of ensuring an effectively cooled extrudable material is to provide a slow, lengthy, and gradual cool down process so as to thicken the extrusion material without overly cooling only portions thereof, and so as to achieve a longer mixing time for increased homogenization. The assembly of the present invention, however, addresses the problems and needs which remain in the art and is able to significantly increase the flow-through rate of extrusion material without compromising the quality of the finished product.

SUMMARY OF THE INVENTION

The present invention relates to a thermoplastic foam extrusion assembly of the type structured to produce an extruded foam product in any of a variety of extruded shapes. In particular, the foam extrusion assembly includes a melt region, which receives and melts a plurality of pellets, preferably thermoplastic material pellets, and a heat extraction region.

Preferably included at the melt region of the foam extrusion assembly is an agent addition assembly. Specifically, the agent addition assembly is structured to add a foaming agent to the melted or melting material pellets for complete blending/mixing and homogenization therewith. To this end, the foam extrusion assembly also includes a mixing assembly. The mixing assembly, which is also preferably included with the melt region, is structured to thoroughly mix the melted material pellets and the foaming agent, thereby achieving a purer, more homogeneous extrusion mixture.

Unlike the melt region, the heat extraction region of the present invention is structured to extract excess heat from the mixture of melted material pellets and foaming agents so that the mixture can achieve an extrudable temperature and consistency. Preferably, the heat extraction region includes an elongate barrel through which the mixture flows. The barrel, which is preferably substantially enclosed, includes at least one inlet and at least one outlet defined therein. The inlet is structured to receive the mixture of melted pellets and foaming agent therethrough, preferably from the melt region, for passage into the barrel.

Cooperatively disposed with the barrel of the heat extraction region is a heat extraction structure. Specifically, the heat extraction structure draws heat from the barrel, such as by liquid cooling, therefore removing heat from the mixture of melted pellets and foaming agent in order to ensure that the extrusion mixture arrives at the extrudable temperature range.

Disposed within the barrel of the heat extraction region is a thermoplastic extrusion screw. This extrusion screw is preferably a cooling screw axially disposed within the barrel and is structured to rotate therein when the barrel contains a quantity of the mixture of melted pellets and blowing agent. In order to urge the mixture of melted pellets and blowing agent towards the outlet of the barrel, the extrusion screw further includes at least one screw flight. The screw flight is preferably structured to wrap around the extrusion screw and thereby rotate upon rotation of the screw in order to urge the mixture towards the outlet of the barrel. In order to achieve effective, complete and evenly distributed cooling of the mixture of melted pellets and foaming agent, however, the screw flight of the present invention further includes at least one, but preferably a plurality of circulation channels defined therein. In particular, the circulation channels are generally precisely positioned in the screw flight so as to receive quantities of the mixture of melted pellets and foaming agent therethrough upon rotation of the extrusion screw. Accordingly, upon receipt of the quantities of the mixture of melted pellets and foaming agent through the circulation channel, an effective circulation of the mixture relative to the barrel is achieved and substantially all of the mixture of melted pellets and foaming agent will substantially uniformly come into close proximity with the barrel for effective and even heat extraction and cooling thereof.

Lastly, the foam extrusion assembly includes a die. In particular, the die is cooperatively disposed in fluid flow communication with the outlet of the barrel, and can take on any of a number of desired forms so as to receive the mixture of melted pellets and foaming agents, at the extrudable temperature, therethrough in order to form a desired shape. Indeed, it is upon exit from the die that the mixture begins to "foam" and thereby produce the finished, extruded product.

It is an object of the present invention to provide a foam extrusion assembly which, during the cooling phase, substantially distributes the cooling effects throughout the extrusion material mixture disposed within the barrel, thereby more effectively, efficiently and uniformly rendering substantially all of the extrusion material at an appropriate extrudable temperature corresponding the polymer or substance being used as the basis for the extrusion mixture.

A further object of the present assembly is to provide an extrusion assembly which can be utilized with existing extrusion structures without substantial modification, yet which substantially increases the overall throughput rate to be achieved to levels as high as generally about a ten to fifty percent increase over currently available through put rates, without sacrificing product quality.

Another object of the present invention is to provide an extrusion screw which can be effectively utilized in existing extrusion assemblies, and yet which more effectively provides for uniform heat extraction from hot and melted extrusion material, without overly cooling the material or heating the material, while at the same time, still substantially increasing the flow through rate to be achieved.

An added object of the present invention is to provide a foam extrusion assembly which substantially overcomes the limitations commonly associated with the cooling phase of the extrusion process.

Also an object of the present invention is to provide a foam extrusion assembly which effectively increases the extrusion production rate without significantly increasing the size and/or complexity of the structure to impractical and uneconomical levels.

Yet another object of the present invention is to provide a thermoplastic extrusion screw which effectively circulates the extrusion mixture and ensures that substantially, if not all of the extrusion mixture effectively and uniformly comes into proximity with the heat extracting surface of the barrel of the extrusion assembly.

Another object of the present invention is to provide a thermoplastic extrusion screw which substantially modifies the flow pattern normally exhibited by an extrusion mixture within an extrusion assembly, thereby providing more efficient and uniform processing thereof and achieving significant advances in the rate at which the extruded product is produced.

Still another object of the present invention is to provide a thermoplastic extrusion screw which effectively circulates the extrusion mixture and provides a substantially homogeneous and high quality product.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
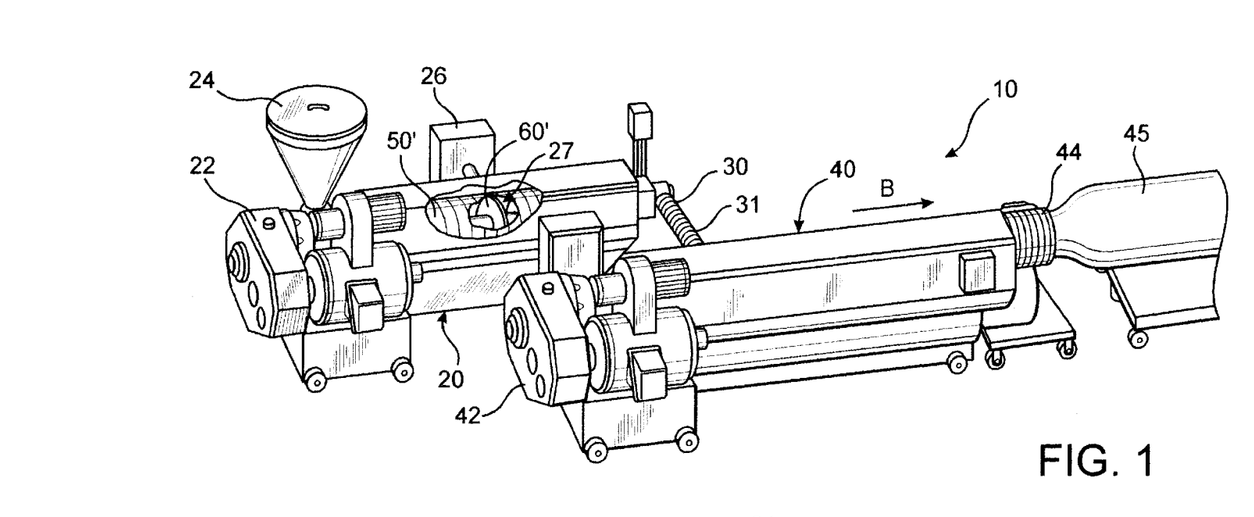
FIG. 1 is a perspective, partial cut away view of the foam extrusion assembly of the present invention.

The present invention is directed towards a foam extrusion assembly, as illustrated in FIG. 1 and generally indicated as 10. Specifically, the extrusion assembly 10 is structured to produce an expandable polymer plastic which foams upon exposure to an external environment in order to produce a finished or semi-finished product. To this end, the foam extrusion assembly 10 of the present invention may be utilized with a number of thermoplastic polymers, including but not limited to polystyrene, polyethylene (PE), polypropylene, PET or other similar thermoplastics, including foaming or expandable thermoplastics or other materials which may be utilized or developed in the future.

As illustrated in FIG. 1, the preferred embodiment of the foam extrusion assembly 10 of the present invention defines a tandem type assembly, although a single, in-line and/or intermeshing twin screw assembly may also be utilized, which if utilized, should also be considered as being within the scope and spirit of this invention. With regard to the tandem assembly illustrated in FIG. 1, however, the foam extrusion assembly 10 includes a first "melt region", generally indicated as 20, and a second "heat extraction" region generally indicated as 40. The first melt region 20 is structured to receive and melt a plurality of thermoplastic material pellets, which preferably form the basis for the product, such as the foam product, to be produced. As is conventional in the industry, the preferred embodiment includes a larger funnel type solids inlet 24 wherethrough large quantities of the raw material, such as material pellets and the like, may be introduced into the melt region 20. Of course, it is noted that the material pellets may include small bead or cylindrical type pellets, larger cubes, blocks, chunks, flakes, powder defining particulate, or any other configuration of the material which can be conveniently introduced into the melt region 20 for subsequent melting thereof. Furthermore, although the melt region 20 may include a large vat or other heating container for direct and immediate melting of the material pellets, in the preferred embodiment, the melt region 20 preferably includes an elongated extrusion barrel 50' through which the material pellets are urged. Specifically, a thermoplastic extrusion screw, such as an interior melt screw 60' is contained within the barrel of the melt region 20 and is preferably driven by a large gear assembly 22 so as to rotate within the melt region 20. As the material pellets are urged through the melt region 20, preferably by the interior melt screw 60' so as to have essentially a "meat-grinder" effect, heat energy is produced to melt the material pellets disposed within the barrel 50'. In the preferred embodiment, at least one heating source, preferably surrounding the wall of the barrel 50' of the melt region 20, applies heat to the barrel 50'. Moreover, the interior melt screw 60' contained in the barrel 50' preferably urges, if not forcing, the material pellets against the interior surface of the barrel 50' and against one another, thereby causing a shear effect which in practice adds the largest quantity of heat to the material pellets and improves the overall melting thereof until a smooth, yet viscous melted material is provided.

As the material pellets alone will generally not provide the necessary foaming reaction when hardening, unless a material with previously incorporated or micro-encapsulated agents is used, and will not become the desired finished foam product, the foam extrusion assembly 10 further includes an agent addition assembly 26. In the preferred embodiment, the agent addition assembly 26 adds a foaming agent to the melted or melting material pellets, preferably as they pass through the melt region 20. Moreover, in the preferred embodiment, the foaming agent may include fluorocarbon, hydro carbon, and/or other equivalent foaming agents or mixtures thereof which will add volume to the finished product and will promote the foaming action when the extruded melt emerges from the foam extrusion assembly 10. Of course, it is understood that other foaming agents may also be developed or provided in the future depending upon the desired finished product, and may indeed be combined with the thermoplastic material prior to its introduction into the melt region 20. Further, if desired, and preferably along with the agent addition assembly 26, a coloring agent and/or a nucleating agent may further be added to the material pellets being melted.

Also, preferably included at the melt region 20, is a mixing assembly 27. The mixing assembly 27 is preferably defined by either all or at least a part of the melt screw 60' which preferably urges the melted material pellets through the melt region 20, and provides for more effective melting as a result of the shear effect produced internally and with the barrel 50'. The mixing assembly 27 is structured to substantially mix the melted material pellets and the blowing agent with one another so as to provide a substantially homogeneous mixture of melted material pellets and foaming agent. In this regard, it is thought to be very important that a thorough and uniform foam extrusion mixture of the melted material pellets and the foaming agent result in order to provide a desired finished product that contains few, if any, deformations, imperfections or irregular structures such as air pockets, irregular cell structures, etc.

Once the extrusion mixture has been effectively homogenized, it is preferably passed directly into the second, "heat extraction" region 40. As illustrated in FIG. 1 with regard to the preferred tandem assembly, this heat extraction region 40 may comprise a separate structure, but alternatively, could merely be a continuation of the melt region 20 as is the case especially in non-foaming thermoplastic extrusion. More specifically, in the preferred embodiment illustrated in FIG. 1, a connector type conduit 30 may be provided so as to transfer the extrusion mixture from the melt region 20 to the heat extraction region 40. The heat extraction region 40 is structured to receive and process the extrusion mixture therethrough and to uniformly extract excess heat from that extrusion mixture such that the mixture will achieve an appropriate extrudable temperature, often between 200 to 300 degrees fahrenheit, depending upon the thermoplastic being used and the amount of gas present therein. In particular, in the foam extrusion process it is necessary for the extrusion mixture to be provided at an appropriate extrudable viscosity. If the temperature of the extrusion material is too hot, the material will have too low of a viscosity, meaning it will be runny and difficult to form into a finished or useable product. Thus, the extrusion material must be sufficiently cooled or viscous, i.e., thickened and gel-like in order to be moldable and formable through a die 44, without being so viscous as to prematurely harden. Accordingly, the heat extraction region 40 is structured to extract excess heat from the extrusion mixture in a controlled, uniform and evenly distributed manner such that substantially all of the extrusion mixture will achieve a uniform and effective extrudable temperature, and such that the extrudable temperature will be achieved throughout the extrusion mixture at an increased pace than is conventionally available.

Referring now to the heat extraction region 40 and the remainder of the Figures, it is seen that the preferred embodiment of the heat extraction region 40 includes an elongated barrel 50. The elongate barrel 50 includes at least one inlet 31, such as at the connector conduit 30, seen in FIG. 1, and at least one outlet, such as at the die 44, defined therein. As such, in the preferred tandem configuration shown in FIG. 1, the extrusion mixture is preferably received from the melt region 20, in a fully or substantially blended form, through the inlet 31 for passage and processing through the barrel 50 prior to formation by the die 44. In this preferred embodiment, the processing to be performed in the heat extraction region 40 is preferably the cooling of the extrusion mixture, although added phases such as further mixing may also be achieved therein.

Cooperatively disposed with the barrel 50 of the heat extraction region 40 is a heat extraction structure. Specifically, the heat extraction structure is structured to draw heat, preferably from the barrel 50, and accordingly, to draw heat from the extrusion mixture contained within and passing through the barrel 50. In the preferred embodiment, the heat extraction structure includes a cooling structure such as a plurality of cooling coils or channels 52 preferably disposed generally about a perimeter of the barrel 50. As such, the heat extraction structure 52 can draw a substantial amount of heat from the perimeter of the barrel 50, and indeed will preferably draw substantial quantities of heat from the quantities of the extrusion mixture disposed in a vicinity of the perimeter 51 of the barrel 50, as will be described in further detail subsequently.

Figure 7:
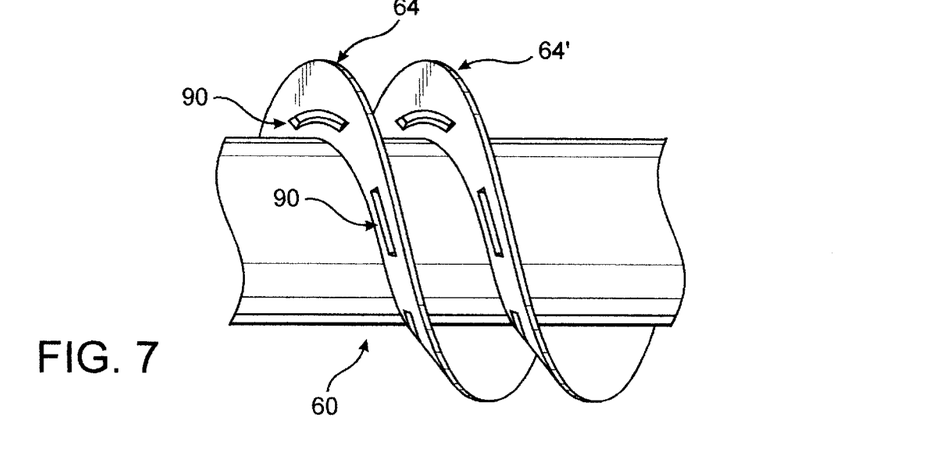
FIG. 7 is a sectional, perspective view of an alternative embodiment of the extrusion screw of the present invention.

Contained within the barrel 50 and preferably sized to achieve a precise yet rotatable fit, is a thermoplastic extrusion screw 60, such as a foam cooling screw. In particular, the extrusion screw 60 is preferably made of stainless steel and also made to be generally elongate, and more preferably, an integrally formed screw that extends the length of the barrel 50. The extrusion screw 60 is also preferably connected to a gear assembly, as at 42, seen in FIG. 1, which rotatably drives the extrusion screw 60 within the barrel 50, although it is also possible for the extrusion screw to be stationary but with an input force applied to urge the extrusion mixture through the barrel. Regardless, the extrusion screw 60 preferably includes at least one screw flight 64, which in a more preferred embodiment is structured to wrap completely about a central elongate shaft 62 so as to define a continuous elongate screw flight 64, although one or more angled scraper blades could also define the flight. Furthermore, while the preferred embodiment includes a single screw flight 64, in an alternative embodiment, as illustrated in FIG. 7, two or more screw flights 64 and 64' may be disposed in line with one another or side by side as in the illustrated alternative so as to define at least one flow path for the extrusion mixture. Of course, it should be noted that the screw flight 64 may but need not extend entirely along the shaft 62 or the barrel 50 depending upon the mixing, heating and/or cooling requirements of the particular system and the particular polymer or material be used as the basis for the extrusion mixture. Moreover, the specific angle of incidence of the screw flight 64 can be varied so as to regulate the speed through which the extrusion mixture flows through the barrel 50.

The screw flight 64, which may be separately or integrally formed with the shaft 62 in one or more continuous or segmented pieces is preferably structured to rotate upon rotation of the entire extrusion screw 60. Moreover, the screw flight 64 is structured to extend from the elongate shaft 62 into substantially close spaced relation with an interior surface 51 of the barrel 50. Indeed, that closely spaced relation between the screw flight 64 and the interior surface 51 of the barrel 50 is generally to very precise tolerances (usually to within generally about 0.001 times the inside barrel diameter which is often about 6 inches) such that minimal seepage of the extrusion mixture passes therebetween upon rotation of the extrusion screw 60 within the barrel 50. Moreover, although the surface of the screw flight 64 is preferably smooth and generally of a lower friction than the interior surface 51 of the barrel 50, the nature of the interior surface 51 of the barrel 50 is such that movement through the barrel 50 is achieved. Accordingly, as the extrusion screw 60 rotates, the relative movement between the screw flight 64 and the interior barrel surface 51 tends to urge the extrusion mixture forward, as illustrated by arrow B in FIGS. 1 and 2, in accordance with the rotation of the extrusion screw 60, as illustrated by arrow A. This movement of the extrusion mixture towards the end that preferably includes the outlet 44 therefore functions to drag or push the extrusion mixture forward, forcing the melt through the die 44 so as to form the foam product 45 which is ultimately utilized in the formation of the finished products.

Figure 2:
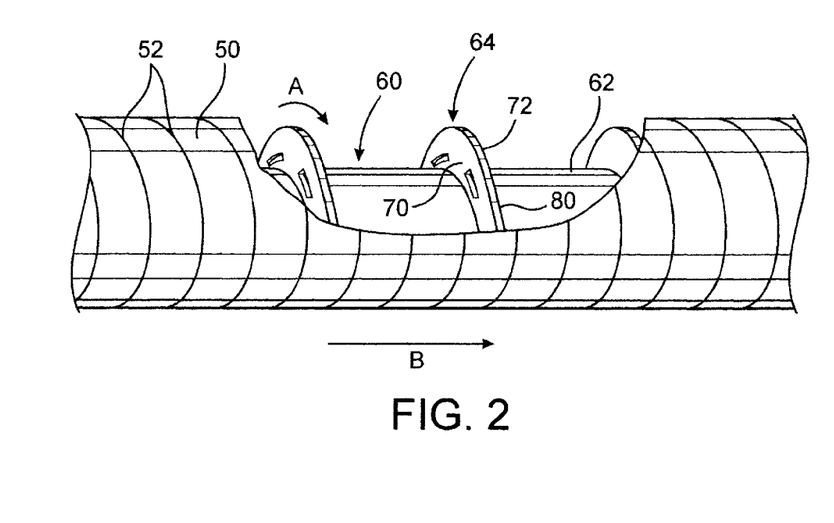
FIG. 2 is a sectional, partial cut-away view of the barrel and extrusion screw of the heat extraction region of the foam extrusion assembly of the present invention.

As previously indicated, the heat extraction structure 52 is preferably disposed about a perimeter of the barrel 50 as shown in FIG. 2. In this embodiment, more heat is extracted from the quantities of the extrusion mixture which are nearest to the interior perimeter surface 51 of the barrel 50. As has been explained, however, substantial considerations relate to the rate at which the extrusion mixture can pass through the heat extraction region 40 in order to attain an appropriate extrudable temperature. For example, while merely increasing the heat extraction rate in conventional systems would appear to increase a throughput rate, if excessive heat is extracted too quickly in an attempt to speed up the process, the quantities of extrusion mixture which are closest to the perimeter of the barrel 51 become over cooled relative to the quantities of the mixture which are closest to the shaft 62 of the extrusion screw. As a result, the heat extraction process of conventional systems must be substantially slow in order to ensure that all of the extrusion mixture arrives as the extrudable temperature uniformly.

Conversely, the structure of the present invention is such that a faster throughput rate of the extrudable mixture through the heat extraction region 40 can be achieved by permitting a greater degree of heat to be withdrawn by the heat extraction structure 52. Specifically, and as illustrated in FIGS. 2 through 7, the screw flight 64 of the thermoplastic extrusion screw, and especially the foam cooling screw of the present invention includes at least one, but preferably a plurality of circulation channels 90 defined therein. The circulation channels 90 are preferably disposed at a spaced apart distance from one another along the screw flight 64, and may extend along the entire screw flight 64 if desired. Preferably the circulation channels 90 are disposed in a generally offset alignment from one another along the preferred continuous screw flight 64, which may be viewed from either a top or bottom view of the extrusion screw 60, so as to interrupt a cross-channel flow and velocity and so as to provide a more turbulent and mixed flow. The circulation channels are also preferably disposed in a lower region of the screw flight 64 so as to be in closer proximity to the screw shaft 62 than to the interior surface 51 of the barrel 50, and most preferably, are disposed generally directly adjacent to the root of the extrusion screw 60. Moreover, a perimeter surface of the circulation channels 90 is preferably completely enclosed and defined by the screw flight 64.

As best shown in FIG. 2, each screw flight 64 preferably includes a leading surface 70, a trailing surface 72 and a perimeter edge 80. Accordingly, as the screw flight 64 rotates, the leading surface 70 essentially scoops up the extrusion mixture and urges it towards the lower pressure trailing surface 72, displacing the extrusion mixture near the screw shaft 62 up towards the interior surface 51 of the barrel 50, and interrupting the normal laminar melt flow, while simultaneously dragging it forward towards the die 44. In the preferred embodiment, the circulation channel 90 extends from the leading surface 70 to the trailing surface 72 such that the extrusion mixture contained within the barrel 50 passes through the circulation channel 90, as in the direction illustrated by arrow C, shown in FIG. 4, upon rotation of the screw flight 64. Moreover, as the quantities of extrusion mixture move from the leading surface side of the screw flight 64 to the trailing surface side of the screw flight, the quantities of extrusion mixture disposed generally at the trailing surface 72 of the screw flight 64 are displaced and pushed upward towards the interior surface 51 of the barrel 50. This circulation of the extrusion mixture through the circulation channels 90 substantially ensures that an even, uniform distribution of cooling is achieved throughout the entire quantity of the extrusion mixture, and that accordingly, a greater quantity of heat can be uniformly extracted so as to permit a more rapid flow through rate. Specifically, more heat can be extracted and the rate of movement can be increased utilizing the present invention since the greater heat extraction is spread out through all of the extrusion mixture and no portion of the mixture is cooled more than another in an attempt to extract heat from neglected regions. Indeed, by way of experimentation it has been noted that with the present invention, foam production output in some systems has increased by over 400 pounds per hour, representing a substantial production increase over previously exhibited maximums of about 950 pounds per hour, representing a 40% increase in productivity.

Figure 3:
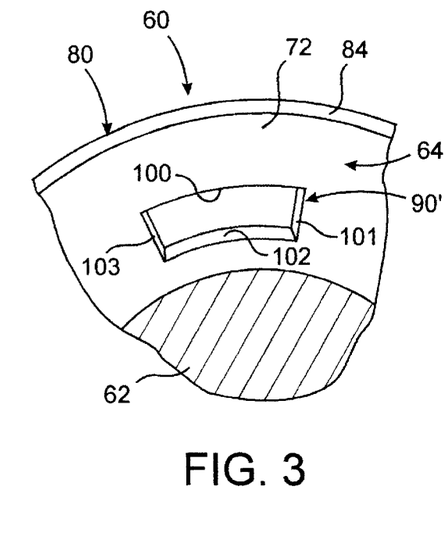
FIG. 3 is an isolated sectional view of the screw flight of the extrusion screw of the present invention.
Figure 4:
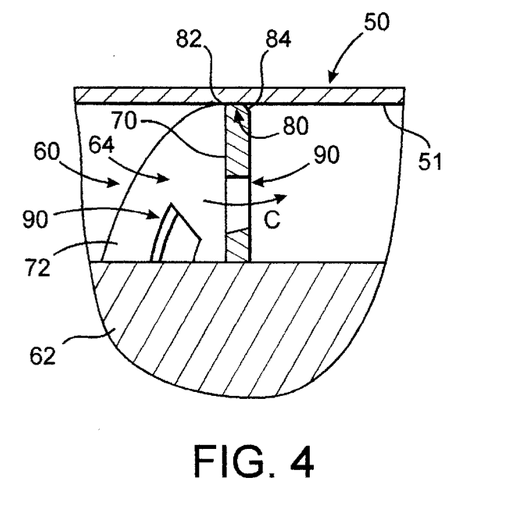
FIG. 4 is a cross sectional view of the screw flight of the extrusion screw of the present invention.
Figure 5:
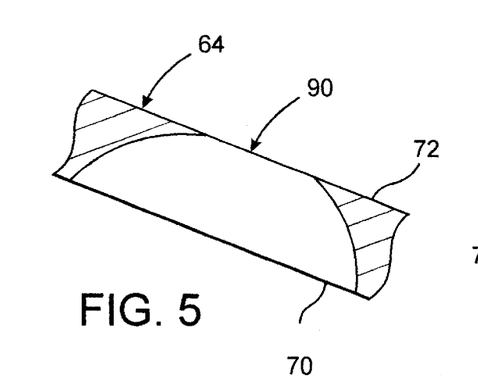
FIG. 5 is a cross sectional, isolated view illustrating a first embodiment of the circulation channel defined in the screw flight of the extrusion screw of the present invention.
Figure 6:
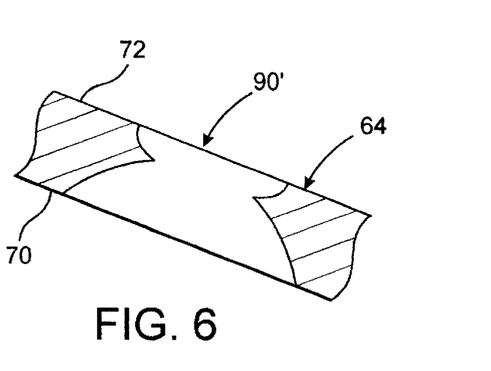
FIG. 6 is a cross sectional, isolated view illustrating an alternative embodiment of the circulation channel defined in the screw flight of the extrusion screw of the present invention.

Turning to FIGS. 3, 5 and 6, so as to more effectively provide for the circulation of the extrusion mixture through the circulation channels 90, in a preferred embodiment of FIG. 5, the circulation channels 90 are inwardly tapered from the leading surface 70 to the trailing surface 72 of the screw flight 64. Such a configuration essentially scoops in maximum quantities of the extrusion mixture for circulation therethrough and tends to provide a "jet" effect that maximizes a flow velocity through the circulation channel 90 and an increased disruption of the state of the extrusion mixture behind the trailing surface 72 is achieved. Furthermore, the circulation channel 90 is preferably structured to be substantially short in length and with a greater inlet area than exit area. Accordingly, as the flow converges into and passes quickly through the circulation channel 90 the extrusion mixture tends to exhibit a maximum swell upon exiting the circulation channel 90, a characteristic that also tends to disrupt the flow patterns and increases a mixing and circulation of the extrusion mixture. Also in the preferred embodiment, and as best seen in FIG. 3, two of the edges of the circulation channel 90, such as the left and right edges 101 and 103 are inwardly tapered to achieve the above-described jet effect and flow convergence, while two of the edges, such as the top and bottom edges 100 and 102, are generally flat. The effect of the flat edges is to generally result in a slippage and erratic shooting through the circulation channel 90, creating flow vortices and disrupting the flow on the trailing surface side of the screw flight. Indeed, as a result of the above recited, preferred asymmetrical inlet area structure of the circulation channel, increased homogenization of the extrusion mixture is achieved, and in the case of the foam cooling screw, a greater circulation for more even cooling of the extrusion mixture is achieved. In an alternative, less preferred embodiment of the circulation channel 90', as illustrated in FIG. 6, an inward taper may be provided from both the leading surface 70 and the trailing surface 72 so as to funnel the extrusion mixture through the circulation channels 90'.

Lastly, and as previously indicated, the perimeter edge 80 of the screw flight 64 is disposed in substantially close spaced relation with the interior surface 51 the foam extrusion barrel 50 in order to minimize seepage therebetween as the screw flight 64 rotates and the foam extrusion mixture is urged forward. In the illustrated preferred embodiment, and so as to achieve an improved and more effective rotation, the perimeter edge 80 of the screw flight 64 is preferably beveled with a trailing portion 84 angled away from the interior surface 51 of the barrel 50 and a leading portion 82 generally confronting and corresponding the contour of the interior surface 51 of the barrel 50. Such a configuration achieves the necessary scraping effect, while also minimizing the surface area that comes into close proximal contact with the interior surface 51 of the barrel 50, to result in the reduction of potential heat shearing.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. To be disposed within an extrusion barrel of a thermoplastic extrusion assembly, a homogenization enhancing extrusion screw comprising:
   an elongate shaft, said elongate shaft disposed in the extrusion barrel;
   at least one screw flight extending from said elongate shaft;
   said screw flight including a leading surface, a trailing surface, and a perimeter edge;
   said screw flight being structured and disposed such that said perimeter edge of said screw flight is disposed in substantially closely spaced relation to an interior surface of the extrusion barrel and an extrusion mixture contained in the extrusion barrel is moved to an end of the extrusion barrel at least partially as a result of said screw flight; and
   said screw flight including at least one circulation channel extending from said leading surface to said trailing surface thereof, said circulation channel structured to permit a quantity of the extrusion mixture disposed at said leading surface of said screw flight and in spaced apart relation from the interior surface of the extrusion barrel to pass therethrough towards said trailing surface of said screw flight and thereby urge a quantity of the extrusion mixture disposed at said trailing surface of said screw flight and in spaced apart relation from the interior surface of the extrusion barrel to move upward toward the interior surface of the extrusion barrel; and
   an inlet area of said circulation channel being greater than an exit area of said circulation channel so as to maximize a flow velocity and swell of said extrusion mixture from said circulation channel.

2. A homogenization enhancing extrusion screw as recited in claim 1 wherein said circulation channel is defined a generally spaced apart distance from said perimeter edge of said screw flight.

3. A homogenization enhancing extrusion screw as recited in claim 1 wherein said circulation channel includes at least one inwardly tapered edge extending from a leading surface of said screw flight towards a trailing surface of said screw flight, and structured to maximize the quantity of said extrusion mixture which enters said circulation channel, and to maximize a flow velocity and swell of said extrusion mixture from said circulation channel.

4. A homogenization enhancing extrusion screw as recited in claim 1 wherein said circulation channel includes at least one generally flat edge structured to maximize a slippage of said extrusion mixture through said circulation channel and create a flow vortex at said trailing surface of said screw flight, thereby maximizing a homogenization of said extrusion mixture.

5. A homogenization enhancing extrusion screw as recited in claim 1 wherein said circulation channel includes an asymmetrical inlet area so as to disrupt a flow pattern of said extrusion mixture through said circulation channel and thereby maximizing a homogenization thereof.

6. A homogenization enhancing extrusion screw as recited in claim 5 wherein said circulation channel includes a pair of inwardly tapered edges structured to maximize a flow velocity and swell of said extrusion mixture from said circulation channel, and a pair of generally flat edges structured to maximize a slippage of said extrusion mixture through said circulation channel and create a flow vortex at said trailing surface of said screw flight.

7. A homogenization enhancing extrusion screw as recited in claim 1 including a plurality of said circulation channels disposed along a length of said elongate shaft in generally offset relation from one another.

8. A homogenization enhancing extrusion screw as recited in claim 1 wherein said circulation channel is substantially short in length so as to minimize a compression time of said extrusion mixture, and maximize a swelling thereof upon exit from said circulation channel.

9. A homogenization enhancing extrusion screw as recited in claim 1 including a plurality of said screw flights disposed a spaced apart distance from one another.

10. A homogenization enhancing extrusion screw as recited in claim 1 wherein said screw flight is structured and disposed to extend along a length of said elongate shaft.

11. A homogenization enhancing extrusion screw as recited in claim 1 wherein said screw flight is disposed so as to define at least one flow path along a length of said elongate shaft.

12. A homogenization enhancing extrusion screw as recited in claim 1 wherein said perimeter edge is beveled with a trailing portion thereof angled away from the interior surface of the extrusion barrel so as to facilitate rotational movement of said screw flight relative to the extrusion barrel without substantial generation of shear heat and seepage between said perimeter edge of said screw flight and the extrusion barrel.

13. To be disposed within an extrusion barrel of a thermoplastic extrusion assembly, a homogenization enhancing extrusion screw comprising:
   an elongate shaft, said elongate shaft disposed in the extrusion barrel;

at least one screw flight extending from said elongate shaft;

said screw flight including a leading surface, a trailing surface, and a perimeter edge;

said screw flight being structured and disposed such that said perimeter edge of said screw flight is disposed in substantially closely spaced relation to an interior surface of the extrusion barrel and an extrusion mixture contained in the extrusion barrel is moved to an end of the extrusion barrel at least partially as a result of said screw flight; and said screw flight including at least one circulation channel extending from said leading surface towards said trailing surface thereof, said circulation channel structured to permit a quantity of the extrusion mixture disposed at said leading surface of said screw flight and in spaced apart relation from the interior surface of the extrusion barrel to pass therethrough towards said trailing surface of said screw flight and thereby urge a quantity of the extrusion mixture disposed at said trailing surface of said screw flight and in spaced apart relation from the interior surface of the extrusion barrel to move upward toward the interior surface of the extrusion barrel; and said circulation channel including at least one inwardly tapered edge extending from a leading surface of said screw flight towards a trailing surface of said screw flight, and structured to maximize the quantity of said extrusion mixture which enters said circulation channel, and to maximize a flow velocity and swell of said extrusion mixture from said circulation channel.

14. To be disposed within an extrusion barrel of a thermoplastic extrusion assembly, a homogenization enhancing extrusion screw comprising:

an elongate shaft, said elongate shaft disposed in the extrusion barrel;

at least one screw flight extending from said elongate shaft;

said screw flight including a leading surface, a trailing surface, and a perimeter edge;

said screw flight being structured and disposed such that said perimeter edge of said screw flight is disposed in substantially closely spaced relation to an interior surface of the extrusion barrel and an extrusion mixture contained in the extrusion barrel is moved to an end of the extrusion barrel at least partially as a result of said screw flight; and said screw flight including at least one circulation channel extending from said leading surface towards said trailing surface thereof, said circulation channel structured to permit a quantity of the extrusion mixture disposed at said leading surface of said screw flight and in spaced apart relation from the interior surface of the extrusion barrel to pass therethrough towards said trailing surface of said screw flight and thereby urge a quantity of the extrusion mixture disposed at said trailing surface of said screw flight and in spaced apart relation from the interior surface of the extrusion barrel to move upward toward the interior surface of the extrusion barrel; and said circulation channel including an asymmetrical inlet area so as to disrupt a flow pattern of said extrusion mixture through said circulation channel and thereby maximize a homogenization thereof.

15. To be disposed within an extrusion barrel of a thermoplastic extrusion assembly, a homogenization enhancing extrusion screw comprising:

an elongate shaft, said elongate shaft disposed in the extrusion barrel;

at least one screw flight extending from said elongate shaft;

said screw flight including a leading surface, a trailing surface, and a perimeter edge;

said screw flight being structured and disposed such that said perimeter edge of said screw flight is disposed in substantially closely spaced relation to an interior surface of the extrusion barrel and an extrusion mixture contained in the extrusion barrel is moved to an end of the extrusion barrel at least partially as a result of said screw flight;

said screw flight including at least one circulation channel extending from said leading surface towards said trailing surface thereof, said circulation channel structured to permit a quantity of the extrusion mixture disposed at said leading surface of said screw flight and in spaced apart relation from the interior surface of the extrusion barrel to pass therethrough towards said trailing surface of said screw flight and thereby urge a quantity of the extrusion mixture disposed at said trailing surface of said screw flight and in spaced apart relation from the interior surface of the extrusion barrel to move upward toward the interior surface of the extrusion barrel; and said perimeter edge being beveled with a trailing portion thereof angled away from the interior surface of the extrusion barrel so as to facilitate rotational movement of said screw flight relative to the extrusion barrel without substantial generation of shear heat and seepage between said perimeter edge of said screw flight and the extrusion barrel.

* * * * *

UNITED STATES PATENT AND TRADEMARK OFFICE
CERTIFICATE OF CORRECTION

PATENT NO. : 6,015,227
DATED : January 18, 2000
INVENTOR(S) : James Fogarty

It is certified that error appears in the above-identified patent and that said Letters Patent is hereby corrected as shown below:

The title page showing the illustrative figures should be deleted and substitute therefor the attached title page.

Delete drawing sheets 1-2 and substitute therefor drawing sheets consisting of figures 1-7.

Signed and Sealed this

Eighth Day of March, 2005

JON W. DUDAS
*Director of the United States Patent and Trademark Office*

United States Patent [19]
Fogarty

[11] Patent Number: 6,015,227
[45] Date of Patent: Jan. 18, 2000

[54] THERMOPLASTIC FOAM EXTRUSION SCREW WITH CIRCULATION CHANNELS

[76] Inventor: James Fogarty, 4970 Alfresco St., Boca Raton, Fla. 33428

[21] Appl. No.: 09/085,316

[22] Filed: May 26, 1998

[51] Int. Cl.$^7$ ............................................. B29B 7/42
[52] U.S. Cl. ............................................. 366/81; 366/90
[58] Field of Search ........................... 366/79, 81, 88–90, 366/318, 319, 324; 425/204, 208, 209; 198/661, 670, 676

[56] References Cited

U.S. PATENT DOCUMENTS

| | | | |
|---|---|---|---|
| 1,428,602 | 9/1922 | Malekow | 366/324 |
| 1,468,581 | 9/1923 | Steenberg | 366/324 |
| 2,474,730 | 6/1949 | Espinasse et al. | 366/324 |
| 3,253,892 | 5/1966 | Brignac et al. | |
| 4,363,264 | 12/1982 | Lang et al. | 366/87 |
| 5,044,759 | 9/1991 | Gagliani | 366/88 |
| 5,476,550 | 12/1995 | Walker | 198/676 |

FOREIGN PATENT DOCUMENTS

341360  6/1936  Italy ..................... 366/324

*Primary Examiner*—Charles E. Cooley
*Attorney, Agent, or Firm*—Malloy & Malloy, P.A.

[57] ABSTRACT

A foam extrusion assembly having a melt region wherein a plurality of material pellets are melted and mixed by a mixing assembly with a blowing agent introduced via an agent addition assembly. The foam extrusion assembly further includes a heat extraction region structured to extract excess heat from the mixture of melted material pellets and blowing agent such that the mixture achieves an extrudable temperature. The heat extraction region includes an elongate barrel having at least one inlet and at least one outlet, the inlet being structured to receive the extrusion mixture therethrough for passage into the barrel wherein a heat extraction structure cooperatively disposed with the barrel draws heat therefrom. An extrusion screw is disposed in the barrel and includes at least one screw flight structured to rotate within the barrel and urge the extrusion mixture towards the outlet of the barrel where a die is disposed in order to form the finished product. Moreover, the screw flight includes at least one circulation channel defined therein and structured to receive quantities of the extrusion mixture therethrough upon rotation of the extrusion screw, thereby circulating the extrusion mixture towards the barrel for more effective and uniform cooling of the extrusion mixture to an extrudable temperature prior to passage through the die.

15 Claims, 2 Drawing Sheets